2,904,549

PYRAZOLONE DERIVATIVES

Ernst Jucker, Binningen, Baselland, and Anton Ebnöther and Adolf J. Lindenmann, Basel, Switzerland, assignors to Sandoz Ltd., Basel, Switzerland, a Swiss firm No Drawing. Application April 28, 1958
Serial No. 731,132

Claims priority, application Switzerland June 11, 1957

8 Claims. (Cl. 260—293.4)

The present invention relates to therapeutically useful pyrazolone derivatives.

The said pyrazolone derivatives, according to the invention, correspond to the formula

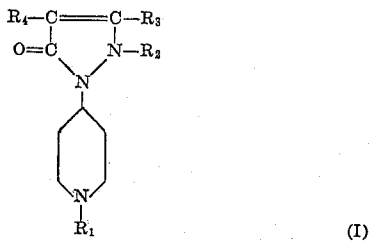

wherein $R_1$ stands for a lower alkyl group (e.g. methyl, ethyl, propyl, butyl, etc.), $R_2$ stands for a hydrogen atom or a lower alkyl group (as precedingly defined), $R_3$ stands for the radical of a five-membered or six-membered heterocyclic compound (e.g. pyridyl, thienyl, furyl, indolyl, etc.), and $R_4$ stands for hydrogen, lower alkyl (e.g. as precedingly defined), lower alkenyl (e.g. allyl, etc.), lower alkynyl (e.g. propynyl, etc.) and lower aralkyl (e.g. benzyl, etc.).

The pyrazolone derivatives of the invention are advantageously prepared by reacting the corresponding piperidyl-4-hydrazine derivatives of the formula

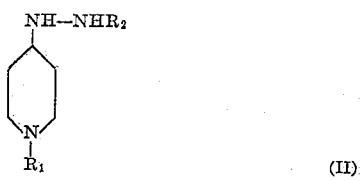

wherein $R_1$ and $R_2$ are as precedingly defined, and the corresponding β-keto-acids or reactive derivatives thereof of the formula $$R_3—CO—CHR_4—COX \qquad (III)$$

wherein $R_3$ and $R_4$ are as precedingly described and X stands for a hydroxyl group, an alkoxy group or a primary or secondary amino group.

The preparation of pyrazolone derivatives by the reaction between β-ketocarboxylic acid esters and hydrazine or its monosubstitution products is known. Of these pyrazolone derivatives, the 1-phenyl-3-methyl-pyrazolone-5 which is obtainable by the condensation of acetoacetic acid ester with phenylhydrazine is of particular significance since, although itself pharmacologically inactive, it is the starting material for the preparation of a number of therapeutically useful compounds, e.g. 1-phenyl-2,3-dimethyl-pyrazolone-5, 1-phenyl-2,3-dimethyl-4-dimethylaminopyrazolone-5 and 1-phenyl-2,3-dimethyl-4-isopropyl-pyrazolone-5. All these compounds, which differ but slightly in their action, have in common the feature of a phenyl substituent in the 1-position of the pyrazolone ring.

Pyrazolones with a piperidine substituent in the 1-position have also heretofore been prepared.

The compounds of the present invention differ from all prior known pyrazolones in that there is a piperidine group at the 1-position of the pyrazolone ring and also a second heterocyclic five- or six-membered ring at the 3-position of the pyrazolone ring. These doubly heterocyclically-substituted pyrazolones of the present invention are characterized by the fact that they themselves possess therapeutically valuable pharmacodynamic properties. The presence of the basic atom groupings in the molecule of the new compounds is of great importance, since these enable the compounds to be readily converted into water-soluble salts by treatment with acids. Thus, they form a wide variety of therapeutically useful salts—the salts having the same pharmaco-dynamic properties as the free compounds themselves. Useful salts comprise for example the hydrohalides (e.g. hydrochlorides and hydrobromides), phosphates, acetates, benzoates, citrates, methanesulfonates, tartrates, succinates and many others.

The new compounds are crystalline at room temperature (20–30° C.) and, depending upon the substituents present in the 3-position, behave as diacidic or triacidic bases.

The specifically novel feature of the new compounds, namely, the presence of a second heterocyclic five- or six-membered ring at the 3-position of the pyrazolone nucleus endows the new compounds with improved therapeutic characteristics. Thus, the new compounds of this invention possess a remarkably low toxicity and a very good tolerability and are outstandingly suitable as antipyretically and analgetically active therapeutica which are remarkably free from undesired side effects.

The convertibility of the new compounds into water-soluble salts of a wide variety of organic and inorganic acids, as already stated, is of especial importance, since only substances of good water-solubility are useful in modern parenteral injection therapy. The salts of the new compounds are distinguished by especially good resorbability when administered per os, for example as tablets or the like. Moreover, it is very easy to prepare highly concentrated aqueous solutions—e.g. ampul solutions for parenteral administration, which has been extremely difficult with known pyrazolones. Doses of 50–200 mg. s.c. are well tolerated without side effects.

The new compounds can be prepared along the following exemplary lines: A piperidyl-4-hydrazine of Formula II is admixed at room temperature with a β-keto-acid ester of Formula III and the mixture allowed to stand for a short time, whereupon warming takes place. In order to complete the reaction, the reaction mixture is heated, alcohol liberated in the course of the condensation being distilled off. The reaction product is purified in suitable manner, e.g. by fractionation in a high vacuum or by recrystallization. If too much heat is developed during the condensation, the reaction partners may be employed in diluted form by dissolution in an inert solvent such, for example, as benzene. If the heat of reaction is not sufficient to cause the solvent to distil off together with the liberated alcohol, the solvent can be removed by heating in vacuo.

The following examples set forth presently preferred illustrative embodiments of the invention; these examples are not however intended to be limitative of the scope of the invention. In the examples, parts are by weight unless otherwise indicated; parts by weight bear the same relationship to parts by volume as do grams to milliliters. Temperatures are in degrees centigrade. Melting points are uncorrected.

Example 1

5.0 parts of isonicotinoyl-acetic acid ethylester are dissolved in 5 parts by volume of benzene, after which 3.67 parts of N-methyl-piperidyl-4-hydrazine are slowly added. The mixture becomes warm upon standing until, in a few minutes, a stormy reaction ensues, whereupon the benzene and ethanol which forms during the condensation are distilled off. In order to run the reaction to completion, the reaction mixture is heated for 15 more minutes to 100°. The crystalline residue—1-(N-methyl-piperidyl-4')-3-(pyridyl-4')-pyrazolone-5 — is recrystallized from ethanol whereupon it has a melting point of 233–237° (with decomposition).

To prepare the dihydrobromide, a solution of the 1-(N-methyl-piperidyl-4')-3-(pyridyl-4')-pyrazolone-5 in methanol is admixed with the calculated quantity of aqueous hydrobromic acid, after which the methanol and the water are completely removed under reduced pressure, and the obtained crystalline residue dried for 24 hours over phosphorus pentoxide at room temperature under reduced pressure. The thus-prepared dihydrobromide of 1-(N-methyl-piperidyl-4')-3-(pyridyl-4')-pyrazolone-5 is triturated with ether, then filtered off and recrystallized from methanol-ether. Melting point=185–189° (decomposition).

Example 2

0.9 part of N-methyl-piperidyl-4-hydrazine and 1.6 parts of α-ethyl-isonicotinoyl-acetic acid ethylester are admixed and allowed to stand for 1 hour at room temperature. The mixture is then heated for 3 hours at 150° and then maintained at this temperature for 30 more minutes under reduced pressure (12 mm. Hg). After cooling, the reaction mixture is distilled in a high vacuum, whereby the obtained 1-(N-methyl-piperidyl-4')-3-(pyridyl-4')-4-ethyl-pyrazolone-5 passes over between 205 and 230° at a pressure of 0.5 mm. Hg.

Upon addition of the calculated quantity of aqueous hydrobromic acid to the base, the dihydrobromide is obtained; melting point 214–217° (decomposition).

Example 3

To 6.6 parts of nicotinoyl-acetic acid ethylester, there is added at room temperature a solution of 3.7 parts of N-methyl-piperidyl-4-hydrazine in 5 parts by volume of benzene and the mixture allowed to stand for one hour, the mixture becoming warm. The mixture is then heated to 100° for 15 more minutes in order to bring the reaction to completion, the benzene and the ethanol liberated during the condensation being distilled off. Upon cooling, the residue — 1-(N-methyl-piperidyl-4')-3-(pyridyl-3')-pyrazolone-5—is recrystallized from ethanol; its melting point then is 200–202°.

Example 4

8.6 parts of N-methyl-piperidyl-4-hydrazine and 15.1 parts of α-ethyl-thenoyl-acetic acid ethylester are admixed and allowed to stand for one hour at room temperature. The mixture is then heated to 150° for 3½ hours, after which it is retained at this temperature for 15 more minutes under a pressure of 12 mm. Hg. After cooling, the reaction mixture is triturated with ether, the obtained ether-insoluble 1-(N-methyl-piperidyl-4')-3-(thienyl-2')-4-ethyl-pyrazolone-5 filtered off and recrystallized from isopropanol. It then melts at 177–178°.

Example 5

A solution of 4.6 parts of β-indolyl-acetic acid ethylester (β-indolyl-(3)-β-oxo-propionic acid ethylester) in 2.5 parts by volume of benzene is added to 2.6 parts of N-methyl-piperidyl-4-hydrazine, and the mixture heated to 100° in the course of 45 minutes. The mixture is then heated to 130° for another 45 minutes, crystallization taking place and the ethanol liberated during the condensation being distilled off. After cooling, the reaction product—1-(N-methyl-piperidyl-4')-3-(indolyl-3')-pyrazolone-5—is triturated with ether, filtered off and recrystallized from ethanol. The product melts at 245–248° (decomposition).

Example 6

2.6 parts of N-methyl-piperidyl-4-hydrazine are added at room temperature to 3.6 parts of α-furoyl-acetic acid ethylester. The mixture becomes warm on standing and, in a few minutes, reaction ensues with strong liberation of heat of reaction, whereby the ethanol liberated during the condensation is distilled off, and the formed 1-(N-methyl-piperidyl-4')-3-(furyl-2')-pyrazolone-5 separates out in crystalline form. To bring the reaction to completion, the reaction mixture is heated to 100° for 15 more minutes. It is then cooled, the pyrazolone derivative triturated with ether, filtered off and recrystallized from ethanol; it then has a melting point of 213–216° (decomposition).

2.59 parts of N-methyl-piperidyl-4-hydrazine and 3.97 parts of α-thenoyl-acetic acid ethylester are admixed and then allowed to stand at room temperature for one hour. The mixture is then heated for 15 minutes at 100°, crystallization taking place and the liberated alcohol being distilled off. After cooling, the reaction product is triturated with ether and filtered off. The filter residue—1-(N-methylpiperidy-4')-3-(thienyl-2')-pyrazolone-5—is recrystallized from isopropanol; it then melts at 216–218° (decomposition).

Example 8

2.8 parts of N-n-butyl-piperidyl-4-hydrazine and 3.0 parts of α-thenoyl-acetic acid ethylester are admixed and allowed to stand for ½ hour at room temperature. The mixture is then heated to 130° in the course of one hour, whereupon after about 20 minutes crystallization takes place. To remove the alcohol which has been liberated, the reaction mixture is kept at the said temperature for 15 more minutes under a pressure at 12 mm. Hg. After cooling, the reaction product—1-(N-n-butyl-piperidyl-4')-3-(thienyl-2')-pyrazolone-5—is triturated with ether, filtered off and recrystallized from isopropanol; it then melts at 178–180° (decomposition).

Example 9

7.7 parts of α-allyl-α-(thenoyl-2)-acetic acid ethylester and 4.1 parts of N-methyl-piperidyl-4-hydrazine are admixed and allowed to stand for ½ hour at room temperature. The mixture is then heated to 110° in the course of 3 hours, after which the mixture is kept at this same temperature but under reduced pressure for another half hour. The reaction mixture is then taken up in a small quantity of isopropanol and cooled slowly, whereupon the formed 1-(N-methyl-piperidyl-4')-3-(thienyl-2')-4-allyl-pyrazolone-5 separates out in crystalline form. After two recrystallizations from isopropanol, it melts at 133–135°.

Example 10

4.7 parts of γ-butyne-α-(thenoyl-2)-α-carboxylic acid ethylester and 2.6 parts of N-methyl-piperidyl-4-hydrazine are admixed and allowed to stand at room temperature for ½ hour. The mixture is then heated to 80° for one hour and to 110° for 2 hours, after which the mixture is kept at the latter temperature for another half hour under a pressure of 12 mm. Hg. The resultant hard dark-brown reaction mixture is then dissolved in warm ethanol. Upon standing in the cold, the reaction product—1-(N-methyl-piperidyl-4')-3-(thienyl-2')-4-prop-2-ynyl-pyrazolone-5—crystallizes out of the solution. After recrystallization from ethanol, the product melts at 150–152° (decomposition).

Example 11

5.76 parts of α-benzoyl-α-(thenoyl-2)-acetic acid ethylester and 2.6 parts of N-methyl-piperidyl-4-hydrazine are admixed and allowed to stand at room temperature for ½ hour. The mixture is then heated to 80° for one hour and to 130° for 3 hours, whereupon the formed 1-(N - methyl-piperidyl-4')-3-(thienyl-2')-4-benzyl-pyrazolone-5 separates out in crystalline form. Upon cooling, the crystal mass is triturated with ether, filtered off, and the pyrazolone derivative recrystallized from ethanol; melting point=201–203° (decomposition).

Example 12

2.8 parts of 1-(N-methyl-piperidyl-4')-2-methyl-hydrazine and 3.6 parts of α-furoyl-acetic acid ethylester are admixed and then allowed to stand at room temperature for ½ hour. The mixture is then heated to 130° in the course of 3 hours and is thereupon kept for another half hour at this same temperature under a pressure of 12 mm. Hg. in order to completely remove liberated alcohol. Upon cooling, the crude reaction mixture is chromatographed on aluminum oxide, the desired pyrazolone derivative — 1 - (N-methyl-piperidyl-4')-2-methyl-3-(furyl-2')-pyrazolone-5 — being eluted with a benzene-chloroform (1:1) solvent mixture. The product may contain 1-methyl - 2 - (N-methyl-piperidyl-4')-3-(furyl-2')-pyrazolone.

Upon the addition of the calculated quantity of aqueous hydrobromic acid to the reaction product, the hydrobromide is obtained. After two recrystallizations from methanol-ether, this salt has a melting point of 225–228° (decomposition).

Example 13

3.9 parts of N-methyl-piperidyl-4-hydrazine and 5.5 parts of α-thenoyl-acetic acid methylester are admixed and allowed to stand at room temperature for ½ hour. The reaction mixture is thereupon heated to 100° for another 15 minutes, whereupon crystallization takes place and the formed methanol is distilled off. After cooling, the reaction mixture is triturated with ether, and filtered. The filter residue—the desired 1-(N-methyl-piperidyl-4')-3-(thienyl-2')-pyrazolone-5—is recrystallized from isopropanol, whereupon it melts at 216–218° (decomposition). The product corresponds to the formula

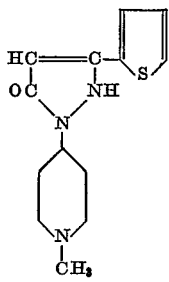

Example 14

6.5 parts of N-methyl-piperidyl-4-hydrazine are added at room temperature to a suspension of 8.5 parts of α-thenoyl-acetic acid (melting point 90–92° from ether-petroleum ether) in 10 parts by volume of benzene. The mixture becomes warm on standing. After 30 minutes, the reaction mixture is heated to 100°, and after one hour is kept for 60 minutes at this same temperature under a pressure of 12 mm. Hg. After cooling, the reaction product is triturated with ether and filtered. The filter residue—1 - (N - methyl-piperidyl-4')-3-(thienyl-2')-pyrazolone-5—is recrystallized from isopropanol; melting point=216–218°.

Having thus disclosed the invention, what is claimed is:

1. A member selected from the group consisting of compounds of the formula

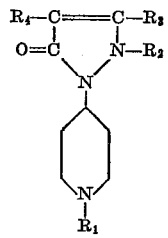

and the therapeutically useful salts thereof, wherein $R_1$ stands for a lower alkyl group, $R_2$ is a member selected from the group consisting of H and lower alkyl, $R_3$ stands for a member selected from the group consisting of pyridyl, thienyl, indolyl and furyl, and $R_4$ represents a member selected from the group consisting of H, lower alkyl, lower alkenyl, lower alkynyl and lower aralkyl.

2. A compound of the formula

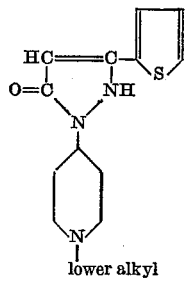

3. A compound of the formula

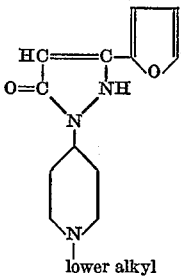

4. 1 - (N - methyl - piperidyl-4')-3-(thienyl-2')-4-ethyl-pyrazolone-5.

5. 1 - (N - methyl - piperidyl-4')-3-(thienyl-2')-4-allyl-pyrazolone-5.

6. 1 - (N-methyl-piperidyl-4')-3-(thienyl-2')-4-prop-2-ynyl-pyrazolone-5.

7. 1 - (N-methyl-piperidyl-4')-3-(thienyl-2')-4-benzyl - pyrazolone-5.

8. 1-(N-methyl-piperidyl-4')-2-methyl-3 - (furyl - 2') - pyrazolone-5.

No references cited.